Figure 1:
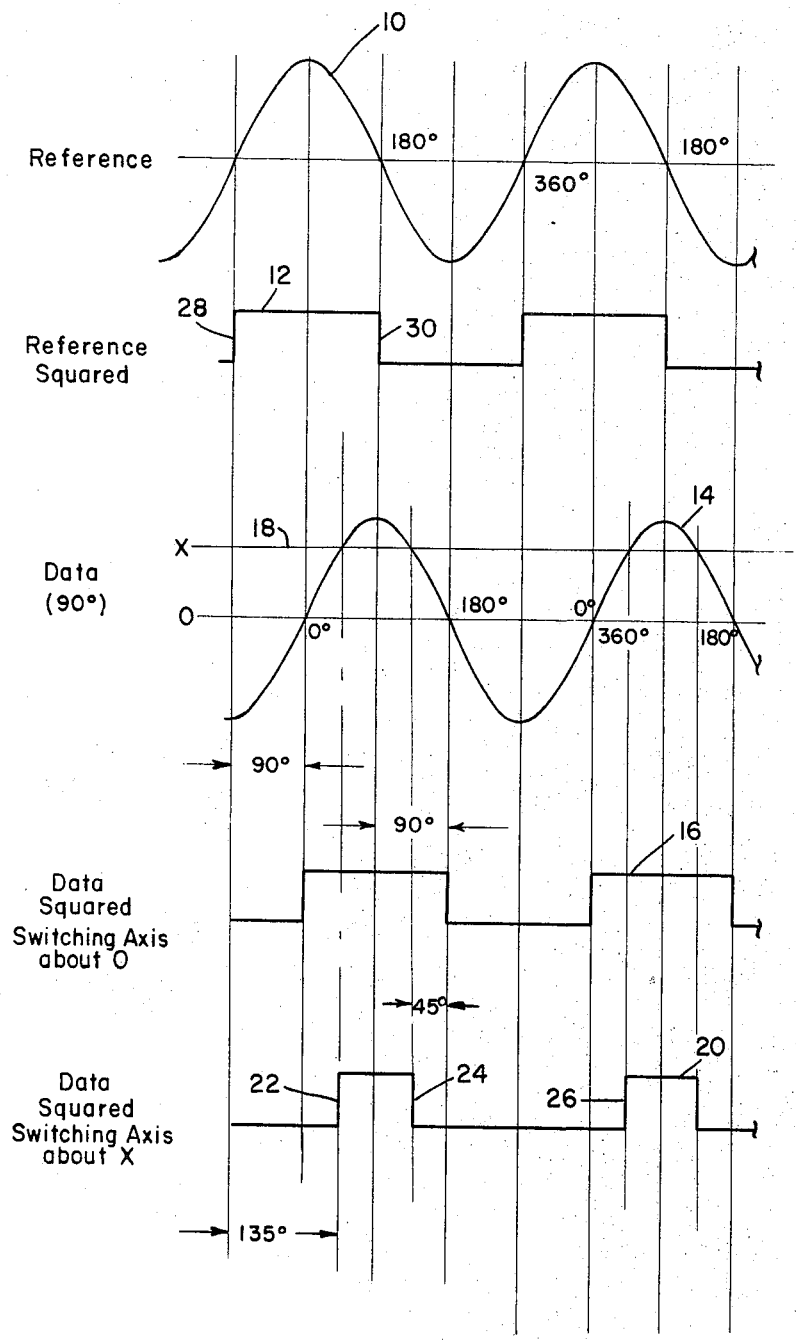

United States Patent [19]
Watt

[11] 3,820,022
[45] June 25, 1974

[54] ASYMMETRICAL WAVE DIGITAL PHASE MEASURING SYSTEM

[75] Inventor: Richard E. Watt, San Diego, Calif.
[73] Assignee: Cubic Corporation, San Diego, Calif.
[22] Filed: Sept. 28, 1972
[21] Appl. No.: 293,108

[52] U.S. Cl............................................. 324/83 D
[51] Int. Cl........................................... G01r 25/02
[58] Field of Search............. 324/83 A, 83 R, 83 D; 328/133, 62

[56] References Cited
UNITED STATES PATENTS
2,721,938  10/1955  Trousdale .......................... 328/62 X
3,624,520  11/1971  Silverman .......................... 328/62 X OTHER PUBLICATIONS
McKinney; Jour. Research N.B.S., Vol. 71C, No. 3, July–Sept. 1967; pp. 227–238.

*Primary Examiner*—Alfred E. Smith
*Attorney, Agent, or Firm*—Marvin H. Kleinberg

[57] ABSTRACT

The phase difference between two CW signals having the same frequency is distorted when the "zero" value of either or both of the signals shifts either in the relatively positive or negative direction, causing an asymmetrical wave. A system of dual clocks in which a first clock measures the phase between positive transitions of the data and reference signals and a second clock measures the phase between negative transitions of the data and reference signals is incorporated. Both measurements occur singularly and/or simultaneously and are averaged to produce an output representative of the phase difference between the reference and the data signal.

6 Claims, 8 Drawing Figures

ASYMMETRICAL WAVE DIGITAL PHASE MEASURING SYSTEM

This invention relates to a digital phase measuring system for use with asymmetrical waves and, more particularly, to a method and apparatus for measuring the phase difference between a reference and data signal in a manner that is more accurate and faster than has heretofore been achieved.

The phase between two corresponding CW signals may be defined as the time between corresponding portions of two different signals of the same frequency. The phase difference between a pair of sine waves having the same frequency can be measured between corresponding portions where the individual sine wave crosses the zero axis.

The time between the positive transition of the first sine wave crossing the zero axis and the positive transition of the second sine wave crossing the zero axis is a measure of the phase difference between the two sine waves, usually measured in degrees. In a digital system, discrete timing pulses generated by a suitable clock generator during the measured time are a measure of the time or phase difference between the waves.

The phase difference between a pair of corresponding symmetrical signals may be measured either by the time between corresponding positive transitions of the two signals or by the time between corresponding negative transitions of the two signals, since both signals are symmetrical and hence both readings should be the same.

Phase measuring systems have found wide applicability in navigation systems and distance measuring systems. The so-called Loran navigating system transmits a pair of accurately located signals in which the measured phase or time difference between the signals is an indication of present location on the Earth. The navigator receives and detects the pair of signals and by means of suitable digital phase measuring equipment, accurately measures the phase or time between the pair of signals to determine his location. Accurate phase measuring equipment is therefore necessary to determine precise location as a function of time.

Distance and angle measuring systems of the so called continuous wave type (CW Radar) continuously compare the phase of a transmitted CW signal with a received CW signal as a measure of distance (or direction cosine) of the object from the point of transmission. The phase difference between the transmitted wave and the received wave can be correlated to the distance (or direction cosine) between the object and the transmitter. Measuring systems employing such techniques and utilizing digital phase meters are more fully described in U.S. Pat. Nos. 3,078,460 and 3,300,780, assigned to the assignee of the present invention.

Since the "zero crossing" of a wave is generally used as the reference point to determine the phase difference between corresponding signals, any variation of the zero crossing as applied to the basic sine wave will have the effect of varying the actual point of the zero crossing in time. For example, a symmetrical sine wave has zero crossings at 0°, 180° and 360°, and in which the time between the 0° and 180° crossings are equal to the time between 180° and the 360° crossing.

Should the zero crossing line be increased in a positive direction, which could occur due to drift or other errors in the system, it can be appreciated that the so-called zero crossing will not occur until some later point in time whereas the 180° crossing will occur at an earlier time. The net effect is that the "positive" half cycle has been "shortened" and the "negative" half cycle has been "lengthened," thereby creating an asymmetrical condition. Measuring the phase between an asymmetrical wave and any other wave will produce an error, regardless of whether the positive excursions are used as the reference point, or whether the negative excursions are used.

In this invention, a method and apparatus are described for measuring the difference in phase between corresponding positive transitions between the two signals and adding to that accumulation the phase as measured between corresponding negative transitions of the two signals. The two phase measurements are accumulated and averaged as a measure of the total phase difference between the two signals.

It can be shown mathematically that the shifting of the zero crossing axis either in a positive or negative direction will increase one side of the signal to the same degree that the other side is decreased and, hence, by measuring the phase difference between the two signals at both the positive transitions and the negative transitions it is possible to average out the error and produce a true indication of the phase difference between the two signals.

The apparatus for performing this operation comprises a first pulse generator selectively connected to a counter through a gating network. The gate is alternatively turned ON and OFF by the positive transition of the pair of signals. A second pulse generator is also selectively controlled by a suitable gating network to the same counter. The second pulse generator is similarly turned ON and OFF, but in this case by the corresponding negative transition of the pair of signals. The counter accumulates the measured phase difference of both of said phase differences and the output is averaged as a measure of the true phase difference between the signals.

The first pulse generator and the second pulse generator preferably operate at the same frequency and generate signals that are out of phase with each other. The counter actually accumulates counts from both of the pulse generators at the same time, depending on the phase difference between the signals. In this manner, a complete reading of the phase difference can be taken within one and a half cycles of the reference signal, whereas in the prior art devices, a minimum of two and a half cycles is needed.

The novel features which are believed to be characteristic of the invention, both as to organization and method of operation, together with further objects and advantages thereof will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

Figure 2:
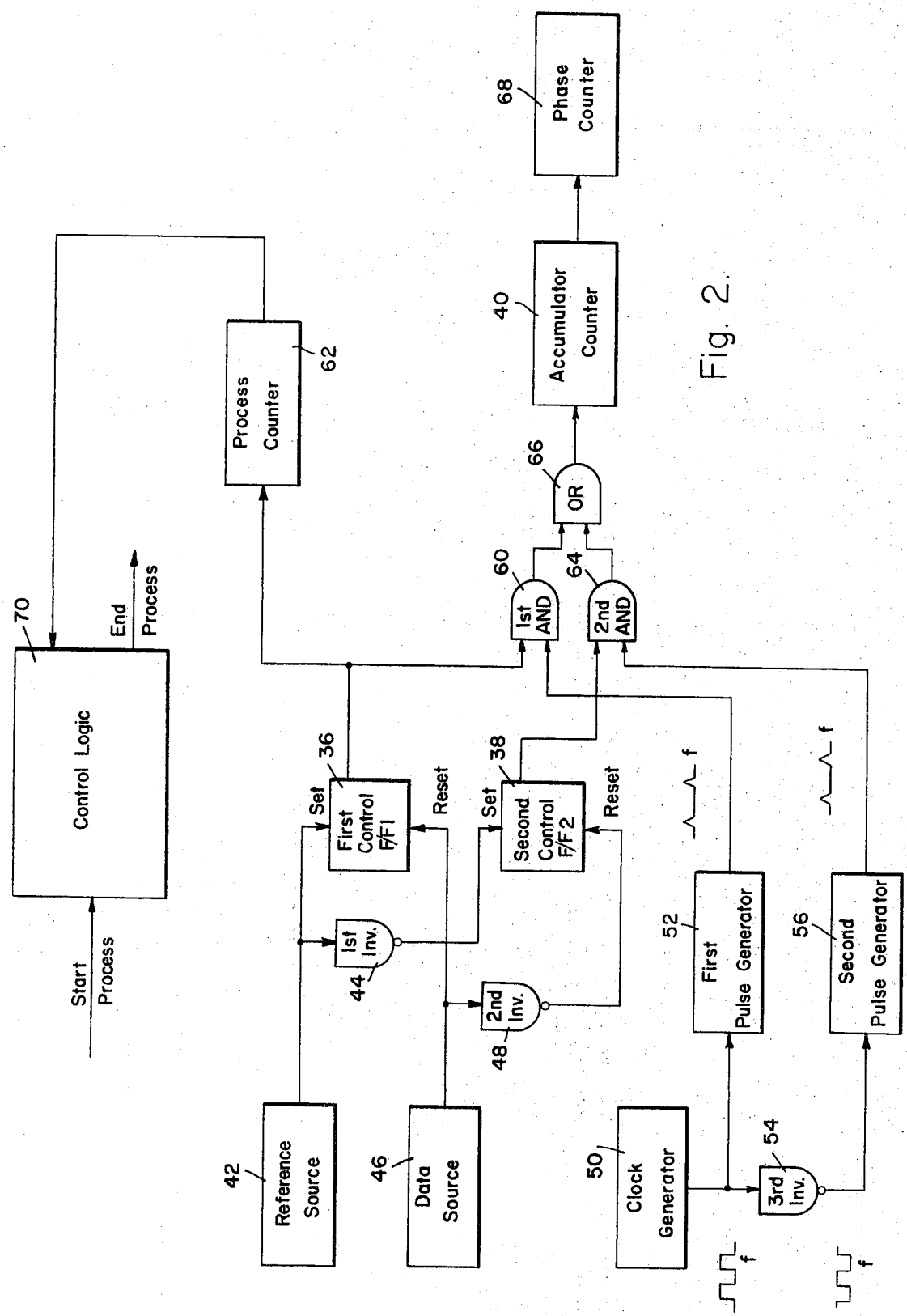
Figure 3:
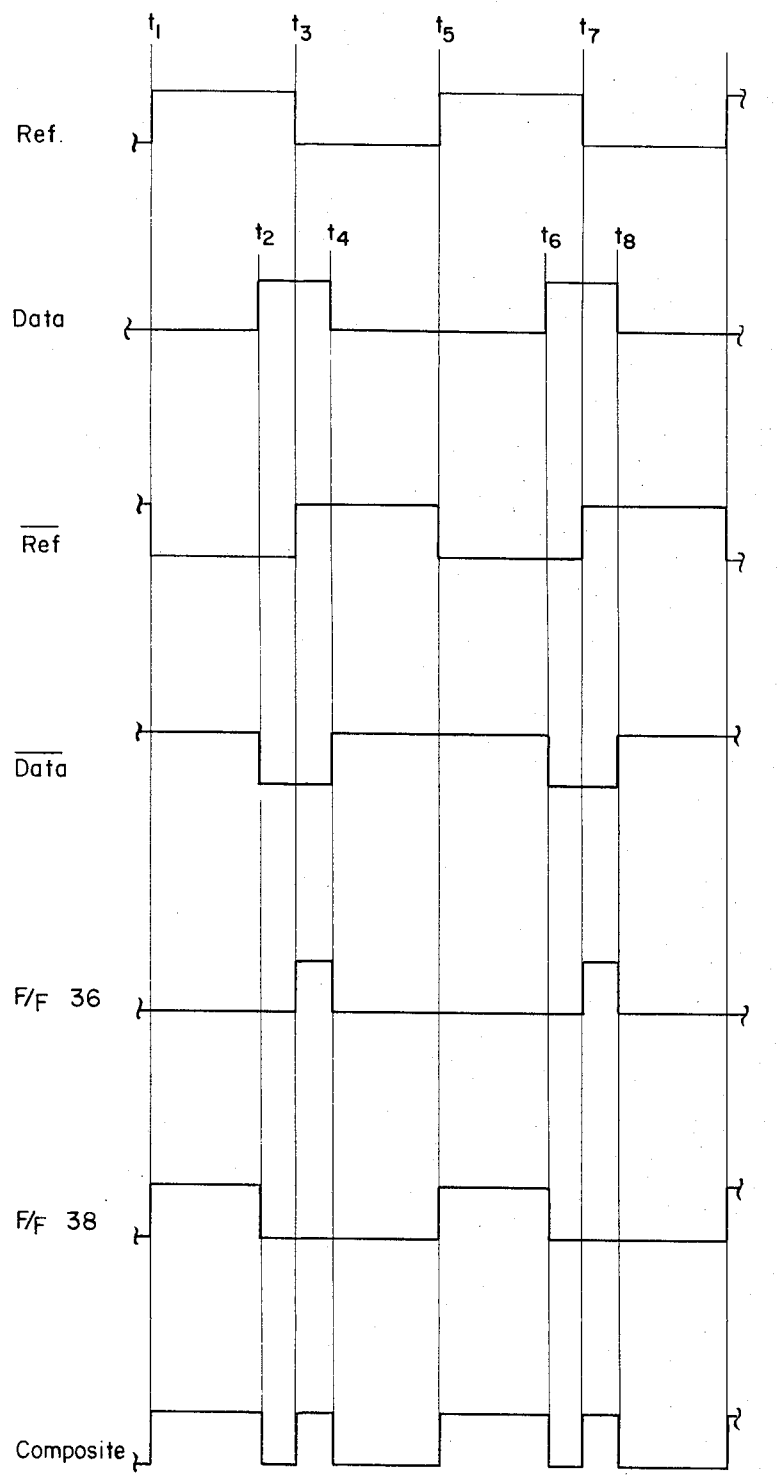
Figure 4:
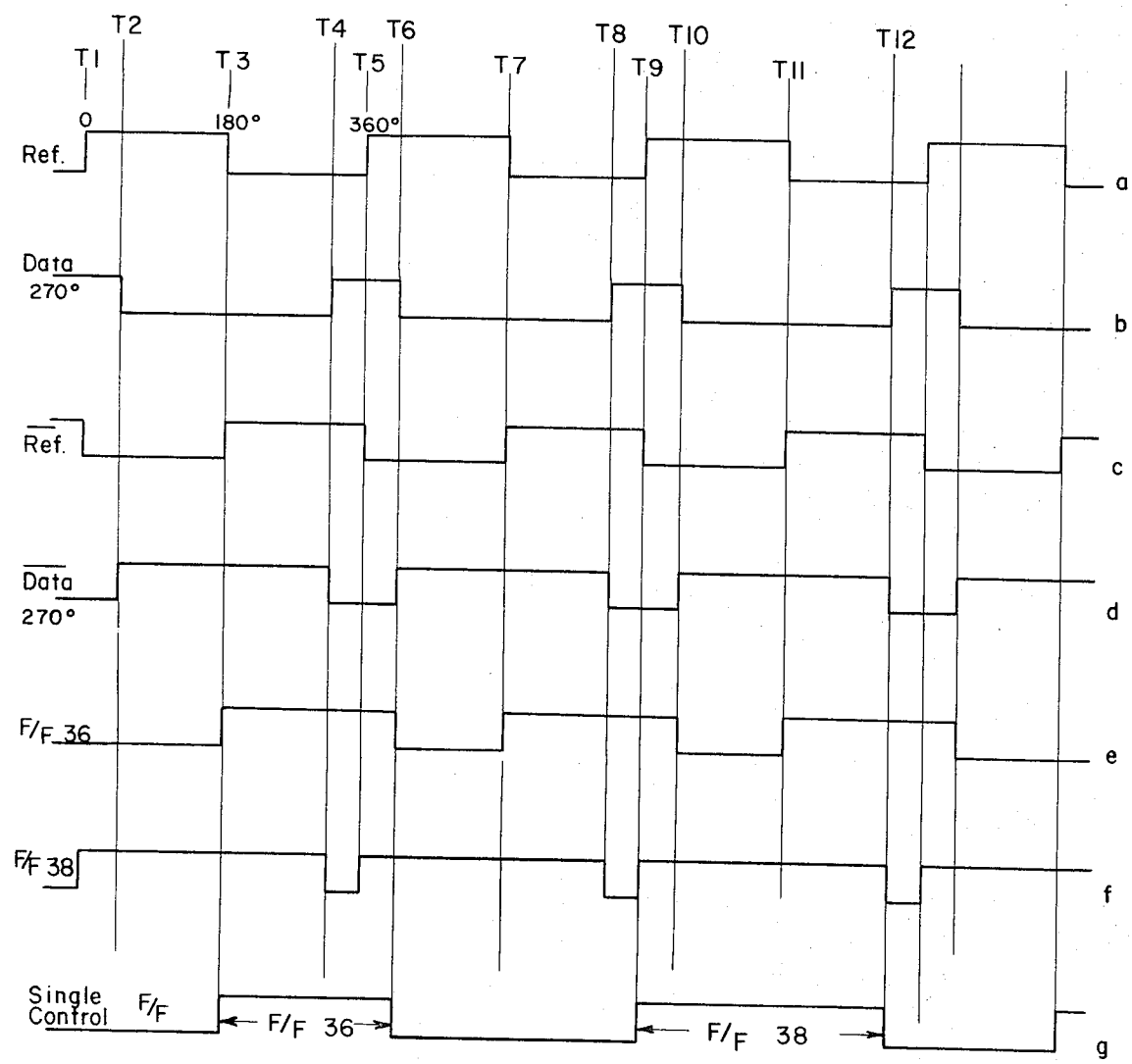

Further objects and advantages of the present invention will be made more apparent to the accompanying drawings wherein:

FIG. 1 including FIGS. 1a – 1e, is a series of wave forms illustrating the problem of asymmetrical waves;

FIG. 2 is a schematic block diagram illustrating a preferred embodiment of the present invention;

FIG. 3, including FIGS. 3a — 3g, inclusive, is a series of wave forms illustrating the operation of the circuit of FIG. 2 for solving the phase difference of 90°; and FIG. 4, including FIGS. 4a – 4g, inclusive, is a series of graphs illustrating a phase difference of 270°.

Referring now to FIG. 1, there is shown a series of diagrams illustrating how a varying zero crossing axis causes an asymmetric wave form. FIG. 1a illustrates a conventional sine wave having periodic zero crossing points at the 0°, 180° and 360° positions.

FIG. 1b illustrates how a square wave is generated from the sine wave of FIG. 1a after the original sine wave is driven "hard" and clipped at some preset amplitude. For all practical purposes, the wave illustrated in FIG. 1b is a square wave having positive transitions at the 0° and 360° crossings and negative transitions at the 180° crossings. The period of the square wave will be the same as the period of the sine wave.

FIG. 1c illustrates a sine wave that has a 90° displacement relative to the sine wave illustrated in FIG. 1a. The square wave illustrated in FIG. 1d is created from the sine wave of FIG. 1c and shown positive transitions at the 0° and 360° crossings and negative transitions at the 180° transitions.

A comparison of the phase difference between the reference sine wave of FIG. 1a and the data sine wave of FIG. 1c will show a 90° displacement. In a similar fashion, a comparison of the reference square wave of FIG. 1b and the data square wave of FIG. 1d will also show a 90° displacement from corresponding zero crossing points.

It is, of course, recognized that the phase difference between the two square waves can be measured from corresponding positive transitions between the curve of FIG. 1b and the curve of FIG. 1d or between negative transitions of the same curves since the distance between corresponding positive transitions and corresponding negative transitions of both waves will be the same, which for this example will be 90°.

Considering now the situation where for some external reason, due either to noise or some arbitrary condition in the circuit, there exists a condition where the circuit switching axis changes in either a negative or positive direction so as to be displaced from the conventionally assumed zero position. Referring now to FIG. 1c, there is shown an arbitrary change of the circuit switching axis to a new level 18, which is illustrated as having displaced the switching points in a "positive" direction.

The illustration would be just as valid had we chosen a displacement in the negative direction. The effect of displacing the switching axis to level 18 on the sine wave 14 illustrated in FIG. 1c is now readily apparent by considering the new square wave 20 illustrated in FIG. 1e. The crossing of the sine wave 14 on the displaced switching axis 18 produces a square wave train 20 having a positive transition 22 at some arbitrary time that is later than the actual zero crossing and depends solely on displacement of the switching axis 18.

In a similar manner, there is generated a negative transition 24 on the square wave train 20 as a result of the sine wave 14 again crossing the displaced switching axis 18. The time or phase position of the negative transition 24 will be at a point in time before the 180° phase position of wave train 14. The sine wave 14 again crossing the displaced switching axis 18 next generates a positive transition 26 on square wave 20 at a point in time after the 360° phase position for sine wave 14.

A review of square wave 20 illustrated in FIG. 1e shows a square wave train comprising a positive transition 22, a negative transition 24, and a positive transition 26. The pulse width between transitions 22 and 24 is less than the pulse width of the negative pulse defined by transitions 24 and 26. It can be appreciated, therefore, that the displaced switching axis 18 on sine wave 14 of FIG. 1c has produced an asymmetrical square wave train 20 as shown in FIG. 1e. The asymmetry has been caused solely by the displacement of the switching axis 18.

A conventional phase detecting system, measuring the difference between a positive transition 28 of the reference square wave curve 12 of FIG. 1b and a positive transition 22 of the asymmetrical square wave of FIG. 1e, will result in a phase reading that is greater than 90° which was the assumed phase difference between the reference sine wave 10 and the data sine wave 14.

Similarly, measuring the phase difference between the negative transition 30 of the reference square wave 12 of FIG. 1b and the negative transition 24 of square wave 20 of FIG. 1e results in a phase difference that is less than 90°, which, again is inconsistent with the original assumption, that the phase difference between the reference sine wave 10 and the data sine wave 14 was 90°.

SUMMARY OF THE INVENTION

The problem is solved, according to the teachings of the present invention, by first measuring the phase between the positive transition 28 of the reference wave 12 and the positive transition 22 of the asymmetrical data wave 20 and next measuring the phase between the negative transition 30 of the reference wave 12 and the negative transition 24 of the asymmetrical wave 20. The two phase measurements are then accumulated, and an average of the total number of accumulated readings is made which represents the true phase difference between the original reference wave 12 and the ideal data wave 16, as illustrated in FIG. 1d. This is shown simply by adding 135° and 45° and dividing by 2 which equals 90°. Transition 28 to 22 equals 135°, and transition 30 to 24 equals 45°.

Referring now to FIG. 2, there is shown a schematic diagram of a preferred embodiment for performing the functions as described in connection with FIG. 1. In the preferred embodiment, a first control flip-flop 36 and a second control flip-flop 38 are used to control an accumulator counter 40. A reference source 42 feeds the first control flip-flop 36 and an inverter 44. The output of the inverter 44 is fed to and controls the second control flip-flop 38. A data source 46, which generates signals equivalent to those illustrated in FIG. 1e, applies these signals to the reset control of the first control flip-flop 36 and a 2nd inverter 48. The output of the 2nd inverter 48 is fed to the reset control of the second control flip-flop 38.

The reference source 42 represents the locally generated reference signals whereas the data source 46 will represent the unknown received signals having a phase relationship that is to be determined.

The signals accumulated by the counter 40 are generated by a clock generator 50 which is adapted to generate a plurality of pulses at a frequency designated as $f$. The output of the clock generator 50 is fed to a first pulse generator 52 and a 3rd inverter 54. The first pulse generator 52 is adapted to generate positive going pulses in the presence of a positive transition input. The output of the first pulse generator 52 therefore will be a plurality of positive going pulses at a frequency that is the same as the frequency generated by the clock generator 50 or at a frequency of $f$.

The third inverter 54 will invert the pulses generated by the clock generator 50 and feed these inverted clock pulses to a second positive pulse generator 56, which is similar to the first pulse generator 52. It will be apparent therefore that the output of the second pulse generator 56 will also be a plurality of positive pulses at a frequency $f$ that is the same as the frequency generated by the clock generator 50.

A comparison of the output of the first pulse generator 52 and the output of the second pulse generator 56 will show that the frequency of pulses is the same. However, the phase relationship is exactly 180°. While it is essential to the practice of the present invention that the frequency of pulses generated by the first pulse generator 52 and the second pulse generator 56 have the same frequency, it is not necessary that the phase relationship be exactly 180° since any fixed phase relationship between the two outputs will be acceptable. The advantages of having dual clock pulses allows simultaneous accumulation in the counter 40.

The output of the first control flip-flop 36 is fed to a 1st AND gate 60 and a process counter 62. The output of the second control flip-flop 38 is fed to a 2nd AND gate 64. The first pulse generator 52 also feeds the 1st AND gate 60, and in a similar manner the second pulse generator 56 feeds the second AND gate 64.

The outputs of both AND gates 60, 64 are fed to an OR gate 66 which feeds the accumulator counter 40. The accumulator counter 40 will accumulate pulses as determined by the pulse generators 52, 56. The phase counter 68 fed by the accumulator counter 40 is used to accumulate the output of counter 40. The count capacity of the accumulator counter 40 is equal to the capacity of the process counter 62, and the count capacity of the phase counter 68 equals the phase resolution of the system, which for this assumed system is 1,000.

The process counter 62 registers a count whenever first control flip-flop 36 generates an output and hence is a measure of the number of actual cycles being accumulated by the accumulator counter 40. For any given system, the number of averaging cycles is preset and determined by a setting of the process counter 62. When the desired count is reached in the process counter 62, a signal is produced which is fed to a control logic 70 which generates an End of Process signal for terminating the process. The control logic 70 also contains the necessary logic for starting the process as well as stopping the process.

In a conventional system having a resolution of measurement of one part in a thousand in which the reference frequency source and the data frequency source are 10 Khz, it can be shown that the clock frequency, as generated by the first and second pulse generators 52, 56, must be 1,000 times 10 Khz or 10 Mhz. In other words, one 360° cycle of phase is then equal to 1,000 clock pulses as accumulated by the counter 40.

The operation of the circuit of FIG. 2 is best understood by referring now to the waveforms of FIG. 3, which illustrate the implementation of a situation in which the reference wave generated by the reference source 42 is considered symmetrical, and the data signal as generated by the data source 46 and illustrated in FIG. 3b has become unsymmetrical as a result of a shift in the switching axis 18.

The first and second control flip-flops 36, 38, illustrated in FIG. 2 are adapted to operate on negative going transitions only. Waveforms illustrated in FIG. 3a will be generated by the reference source 42, whereas the waveform in FIG. 3b is of the type generated by the data source 46. At time $t_1$ the positive transition has no effect on the first control flip-flop 36 since the control flip-flop responds only to negative going signals.

However, the inverter 44 inverts the positive going signal to a negative going signal as shown in FIG. 3c, which is fed to the set control flip-flop 38. Flip-flop 38 is turned ON and controls the AND gate 64 so as to allow pulses from the pulse generator 56 to pass through the AND gate and through the OR gate 66 to the accumulator counter 40. This process will continue until the positive transition of the data signal is generated by the data source 46.

Time $t_2$ illustrates the positive transition of the data signal generated by the data source 46 and which is inverted by inverter 48 and fed to the reset of flip-flop 38. The positive transition generated by the data source 46 will have no effect on flip-flop 36 since it is a positive going signal. The inverter 48 inverts the positive transition signal as shown by curve of FIG. 3d. The negative transition fed to the reset of control flip-flop 38 will turn the flip-flop off and stop the accumulation of pulses from the pulse generator 56 through the AND gate 64. The accumulation time for pulses in the accumulator counter 40 is shown by curve FIG. 3f.

Similarly, at time $t_3$, the negative transition of the data signal of FIG. 3a is generated by the reference source 42 to set the control flip-flop 36 and generate an output signal turning on the AND gate 60, which allows pulses from the pulse generator 52 to pass through the AND gate 60, the OR gate 66, and eventually to be accumulated by the accumulator counter 40. In addition, the output of the control flip-flop 36 also feeds the process counter 60 to indicate the number of cycles generated by the reference source 42. Process counter 62 is preset to generate a signal for the control logic 70 when the preset number of cycles have been accumulated.

At time $t_4$ there is generated a negative transition of the data signal of FIG. 3b as generated by the data source 46 which resets the control flip-flop 36 and terminates the accumulation of pulses from pulse generator 52 in the accumulator counter 40. The pulse accumulation time generated by flip-flop 36 is shown in FIG. 3e.

For a single cycle, therefore, it can be appreciated that the accumulator counter 40 will accumulate pulses as determined by curve of FIG. 3e and the curve of FIG. 3f. If we assume that FIG. 3e represents 45° then accumulator counter 40 will have accumulated 125 pulses. If we assume that FIG. 3f represents a pulse width of 135°, then the accumulator counter 40 will have accumulated an additional 375 pulses for a total of 500 pulses.

The phase counter 68 counts the output of the accumulator counter 40 and will indicate 250 pulses, which is read out as 90° for a case where only two readings are to be averaged together. For this case, the accumulator counter would be a single flip-flop and simply divides 500 by two.

For different applications it has been found desirous to repeat the reading in order to average out short term changes due to noise components that appear on the data signal. In a system requiring a reading of 256 cycles, the accumulator counter 40 would actually divide the total accumulated count by 256. The phase counter 68 would count the resulting output of the accumulator counter 40. The process counter 62 would be preset to stop the control logic 70 when 256 impulses have been detected to thereby indicate that 256 cycles of the data signal have been generated.

The advantages of the simultaneous accumulation in the accumulator counter 40 and in the phase counter 68 from both the pulse generator 52 and pulse generator 56 will be made more apparent by referring now to FIG. 4, which illustrates the waveforms in which the data wave, FIG. 4b, is 270° displaced from the reference wave of FIG. 4a. At time $t_1$, the positive transition of the reference wave, FIG. 4a, will result in control flip-flop 38 being turned ON to start the accumulation of the pulse generator 56 output into the accumulator counter 40, as previously described and illustrated in FIG. 4f.

At time $t_2$, the negative transition of the data signal, FIG. 4b, the control flip-flop 36 remains reset, because for the very first 180° of operation the control flip-flop 36 has not been set and hence there is no effect on the count from the pulse generator 52.

Time $t_3$ is the negative transition of the reference signal, FIG. 4a, which results in control flip-flop 36 being set and turning on pulse generator 52. From time $t_3$, it can now be appreciated that the accumulator counter 40 is counting the pulses generated by both the pulse generator 52 and also the pulses generated by the pulse generator 56. Since the pulses generated by both pulse generators are out of phase, this permits the accumulator counter 40 to accumulate at twice the frequency rate or either pulse generator.

The process of accumulating pulses from both pulse generators 52, 56 is the basic reason why the defined system can measure phases in less time than previous systems which require a sequential operation as opposed to the parallel operation taking place here.

Time $t_4$ is the positive transition of the data signal in FIG. 4b which results in control flip-flop 38 being reset and stopping the accumulation of pulses from pulse generator 56. However, it will be noted that the accumulator counter 40 is still accumulating pulses from pulse generator 52.

Time $t_5$ is the positive transition of the reference signal, FIG. 4a, which sets control flip-flop 38 which starts the accumulation of the pulse generator 56 into the accumulator counter 40. It will be noted that control flip-flop 36 is still on and allowing the accumulation of pulses from the pulse generator 52 at this time.

Time $t_6$ is the negative transition of the data signal, FIG. 4b, which resets control flip-flop 36, terminating the accumulation of pulses from the pulse generator 52. It will be noted, however, that at time $t_6$ the control flip-flop 38 is still on, allowing the accumulation of pulses from the pulse generator 56, thereby showing that between times $t_5$ and $t_6$ the accumulator counter 40 is again accumulating pulses from both pulse generator 52 and pulse generator 56.

The process will continue to repeat itself for as long as the process counter 62 permits. A review of the events between $t_1$ and $t_2$, which is the start of the operation, will show that only control flip-flop 38 was on, whereas a review of the events between time $t_5$ and $t_6$, which is similar to the times between time $t_1$ and $t_2$, will actually show that control flip-flop 38 and control flip-flop 36 were on at the same time. The control logic controls the operation of flip-flops 36, 38 so that each makes the same number of control cycles. For 256 averaging cycles, each flip-flop makes 128 cycles, thus eliminating the asymmetry error over the period of the measurement.

The required control waveform for a sequential, single-clock phasemeter is shown in FIG. 4g. This shows that control flip-flop 36 would be on between times $t_3$ and $t_6$ and that control flip-flop 38 would be on between times $t_9$ and $t_{12}$. To make the same reading by using a single clock with a single control flip-flop, it would require at least three full cycles of the reference wave, FIG. 4a, as compared to the present invention which has made the complete measurement from time $t_1$ to time $t_6$, which is actually less than one and a half cycles.

What is claimed as new is:

1. A system for measuring the phase between a pair of signals having the same frequency comprising:
    a first pulse generator selectively connected to a counter through a first AND gate,
    first flip-flop means for alternatively enabling and disabling said first AND gate by the positive transitions of the pair of signals respectively, to thereby accumulate a first plurality of pulses,
    a second pulse generator selectively connected to said counter through a second AND gate,
    second flip-flop means for alternatively enabling and disabling said second AND gate by the negative transitions of the pair of signals respectively, to thereby accumulate a second plurality of pulses,
    accumulator means for totaling the accumulated first plurality of pulses, and
    means for determining the phase difference between the pair of signals as a function of said pluralities of pulses.

2. A system according to claim 1 in which said first pulse generator and said second pulse generator generate out of phase pulses at the same frequency.

3. A system according to claim 2 in which the pulse generated by said first generator is 180° out of phase with the pulses generated by said second generator.

4. A system according to claim 1 which includes a single clock generator feeding said first pulse generator for generating positive pulses on positive transitions of the clock generator,
    an inverter connected to said clock generator to generate pulses of the opposite polarity, and
    said second pulse generator fed by said inverter for generating positive pulses on positive transitions of the inverted clock pulses whereby said first and second pulse generators generate pulses 180° out of phase with respect to each other and at the same frequency as said clock generator.

5. A system according to claim 1 in which said first and second pulse generators feed pulses simultaneously to said counter, through said enabled first and second AND gates.

6. A system according to claim 1 further including control means coupled to one of said flip-flop means and operable in response to the successive enablings of said flip-flop means for disabling the system after a predetermined number of enablings, and wherein said means for determining phase difference include an overflow counter coupled to said accumulator means for storing a count representative of the total accumulated pulses.

* * * * *